US 6,575,638 B2

(12) United States Patent
Martins et al.

(10) Patent No.: US 6,575,638 B2
(45) Date of Patent: Jun. 10, 2003

(54) BAYONET ROLL END ADAPTOR

(75) Inventors: Armando S. Martins, Cumberland, RI (US); Peter N. Osgood, Upton, MA (US); Dennis H. Shriner, Webster, MA (US)

(73) Assignee: Morgan Construction Company, Worcester, MA (US)

( * ) Notice: Subject to any disclaimer, the term of this patent is extended or adjusted under 35 U.S.C. 154(b) by 0 days.

(21) Appl. No.: 09/934,876

(22) Filed: Aug. 22, 2001

(65) Prior Publication Data

US 2002/0081054 A1 Jun. 27, 2002

Related U.S. Application Data

(60) Provisional application No. 60/236,239, filed on Sep. 28, 2000.

(51) Int. Cl.[7] .............................................. F16C 43/04
(52) U.S. Cl. ....................................... 384/559; 384/584
(58) Field of Search ................... 384/537, 559, 384/560, 561, 562, 584, 585

(56) References Cited

U.S. PATENT DOCUMENTS

| 2,631,069 A | * | 3/1953 | Starr ........................... 384/439 |
| 4,286,830 A |   | 9/1981 | Salter, Jr. |
| 4,398,776 A | * | 8/1983 | Kutemeier .................. 384/560 |
| 5,080,501 A | * | 1/1992 | Siebert et al. .............. 384/537 |
| 5,154,518 A | * | 10/1992 | Goforth, Jr. ................ 384/563 |
| 5,211,487 A | * | 5/1993 | Hannon et al. ............. 384/562 |

FOREIGN PATENT DOCUMENTS

| DE | 2850398 A1 | 10/1997 |
| EP | 1072333 A2 | 1/2001 |
| WO | WO 01/21333 A2 | 3/2001 |

* cited by examiner

*Primary Examiner*—Jack Lavinder
*Assistant Examiner*—Thomas J. Williams
(74) *Attorney, Agent, or Firm*—Samuels, Gauthier & Stevens, LLP

(57) ABSTRACT

An apparatus for retaining a bearing assembly on the neck of a roll in a rolling mill. The apparatus includes an adaptor element having outwardly projecting first lugs circumferentially separated by first flutes. Fasteners detachably secure the adaptor element to a distal end of the roll neck. A locking element, which comprises an integral component of the bearing assembly, has inwardly projecting second lugs circumferentially separated by second flutes. The locking element is rotatable between an unlocked position at which its second lugs are aligned with the first flutes of the adaptor element to accommodate axial shifting of the bearing assembly onto and off of the roll neck, and a locked position at which its second lugs are aligned with the first lugs of the adaptor element to axially retain the bearing assembly on the roll neck.

8 Claims, 3 Drawing Sheets

BAYONET ROLL END ADAPTOR

PRIORITY INFORMATION

This application claims priority from provisional patent application Ser. No. 60/236,239 filed Sep. 28, 2000.

BACKGROUND OF THE INVENTION

1. Field of the Invention

This invention relates to bearing assemblies for rotatably supporting the roll necks of rolls in a rolling mill.

2. Description of the Prior Art

Over the years, various arrangements have been developed for retaining bearing assemblies on the necks of rolls in rolling mills. These arrangements invariably require some alteration to the cylindrical distal ends of the roll necks. Such alternations typically comprise, for example, cutting circular grooves or machining circumferentially spaced radially projecting bayonet lugs into the roll ends. In such cases, the roll ends must be lengthened in order to accommodate the required machining.

The circular grooves weaken the roll necks and provide areas of potentially damaging stress concentrations. The split adaptor rings that are seated in the grooves are difficult and expensive to machine, and are themselves prone to failure due to overstressing. Machining bayonet lugs into the roll ends is also a costly operation.

SUMMARY OF THE INVENTION

In accordance with the present invention, the above described problems and shortcomings are avoided by detachably securing an adaptor element to the distal end of the roll neck. The adaptor element has outwardly projecting first bayonet lugs separated by first flutes. A locking element comprising an integral component of the bearing assembly has inwardly projecting second bayonet lugs separated by second flutes. The locking element is rotatable between a unlocked position at which its second bayonet lugs are aligned with the a first flutes of the adaptor element to thereby accommodate axial shifting of the bearing assembly onto and off of the roll neck, and a locked position at which its second bayonet lugs are aligned with the adaptor element's first bayonet lugs to axially retain the bearing assembly on the roll neck.

The adaptor element projects axially from the distal end of the roll neck, and is preferably ring-shaped with inwardly projecting third bayonet lugs configured and arranged to coact with a separable hydraulically actuated tool which may be used to urge the bearing assembly onto and off of the roll neck.

Other features and advantages of the present invention will now be described in greater detail with reference to the accompanying drawings, wherein:

DESCRIPTION OF PREFERRED EMBODIMENT

Figure 1:
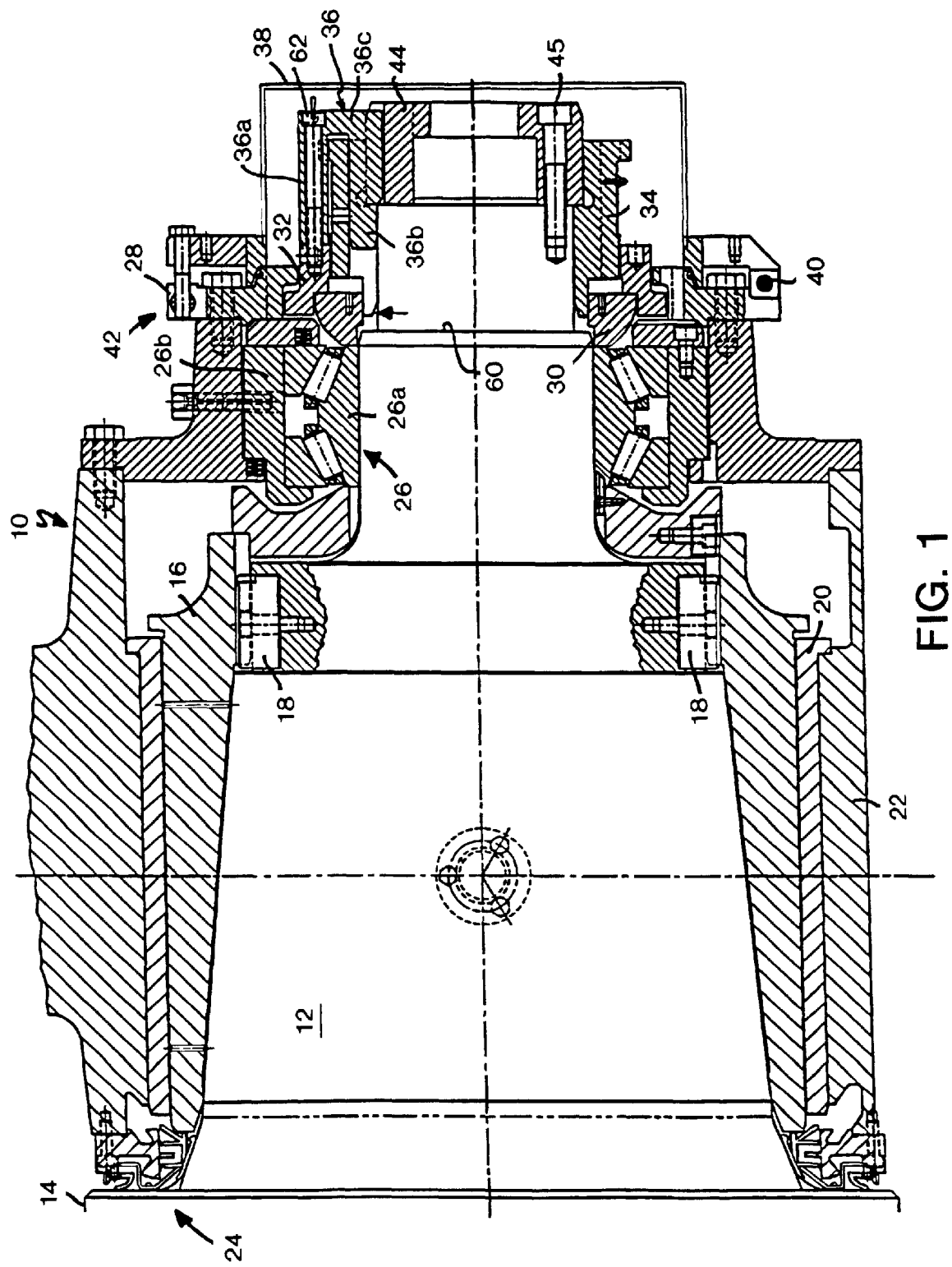
FIG. 1 is a longitudinal sectional view through a bearing assembly axially retained on a roll neck by an adaptor element in accordance with the present invention.

With reference initially to FIG. 1, an oil film bearing assembly is generally indicated at 10 and shown mounted on the tapered neck section 12 of a roll 14 of the type found in rolling mills. The bearing assembly includes a sleeve 16 keyed to the roll neck as at 18. The sleeve is surrounded by a bushing 20 fixed within a chock 22. The chock is adapted to be supported in a roll housing (not shown). During mill operation, oil is introduced continuously between the sleeve 16 and bushing 20, resulting in the sleeve being rotatably supported on a hydrodynamically maintained film of oil at the bearing load zone.

On its inboard side, the bearing assembly further includes a seal assembly 24. The outboard side of the bearing assembly includes: a thrust bearing 26 having an inner race 26a and outer races contained by a thrust bearing retainer 26b; an end plate 28; a circular transfer plate 30; a lock nut 32 threaded onto a threaded ring 34; a coupling element 36 mechanically coupling the threaded ring 34 to the lock nut 32; and an end cover 38 pivotally connected at 40 to the end plate 28 and held in a closed position by latching mechanism 42.

An adaptor element 44 in accordance with the present invention is secured to the distal end of the roll neck by cap screws 45 and the like.

Figure 2:
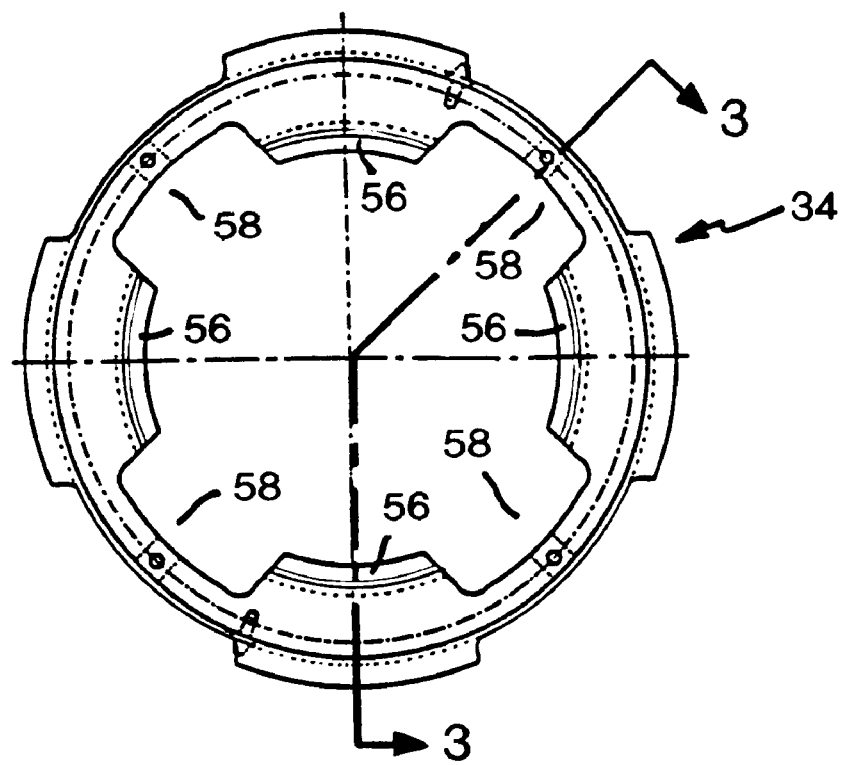
FIG. 2 is an end view of the threaded ring shown in FIG. 1.
Figure 3:
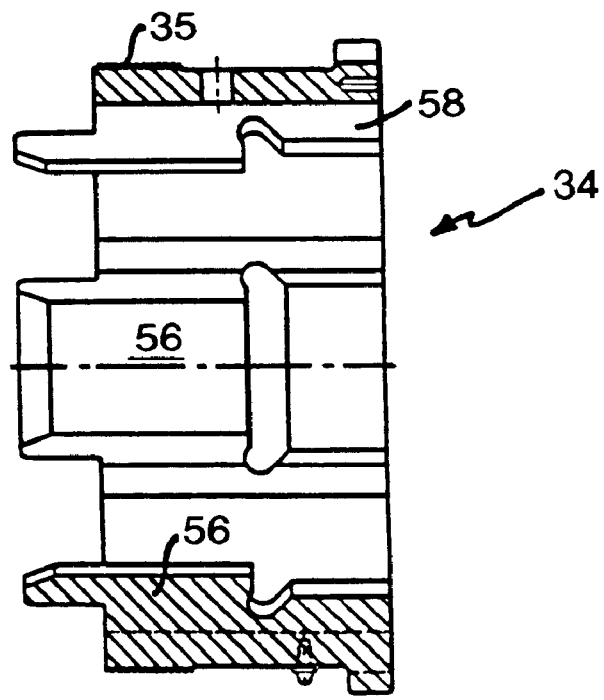
FIG. 3 is a sectional view taken along line 3—3 of FIG. 2.

As shown in FIGS. 2 and 3, the threaded ring 34 is externally threaded at 35, and is provided internally with inwardly protruding lugs 56 circumferentially spaced by flutes 58. When the threaded ring is positioned as shown in FIG. 1, its lugs 56 are captured between the adaptor 44 and a shoulder 60 on the roll neck.

The lock nut 32 is threaded onto the ring 34, and in its tightened condition as shown in FIG. 1, bears against the transfer plate 30, the latter in turn being held against the inner race 26a of the thrust bearing.

The coupling element 36 includes upper and lower parallel legs 36a, 36b joined by a web 36c. The upper leg 36a is secured to the lock nut 32 by one or more screws 62, and the lower leg 36b extends into one of the flutes 58 between the inwardly protruding lugs 56 of the threaded ring 34. When thus positioned, the coupling element prevents relative rotation between the lock nut 32 and the threaded ring 34.

The bearing assembly 10 is axially mounted on and removed from the tapered roll neck section 12 by means of a portable hydraulically actuated tool (not shown). A preferred embodiment of one such tool is described in copending U.S. patent application Ser. No. 09/605,601, now U.S. Pat. No. 6,415,489, filed Jun. 28, 2000, the disclosure of which is herein incorporated by reference in its entirety.

Figure 4:
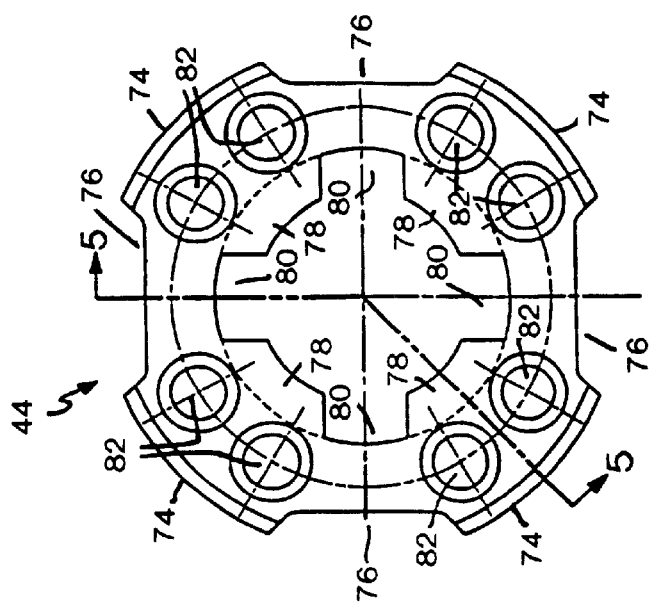
FIG. 4 is an outboard end view of the adaptor element.
Figure 5:
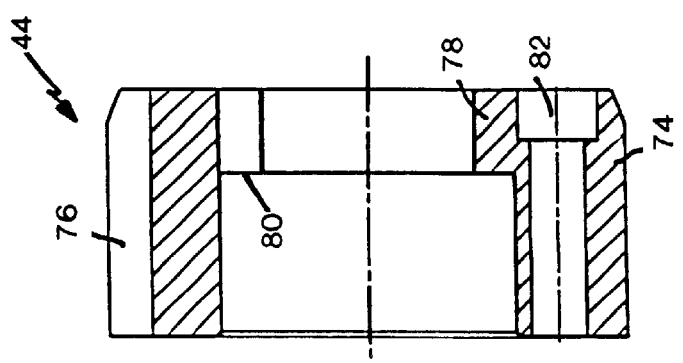
FIG. 5 is a sectional view taken along line 5—5 of FIG. 4.
Figure 6:
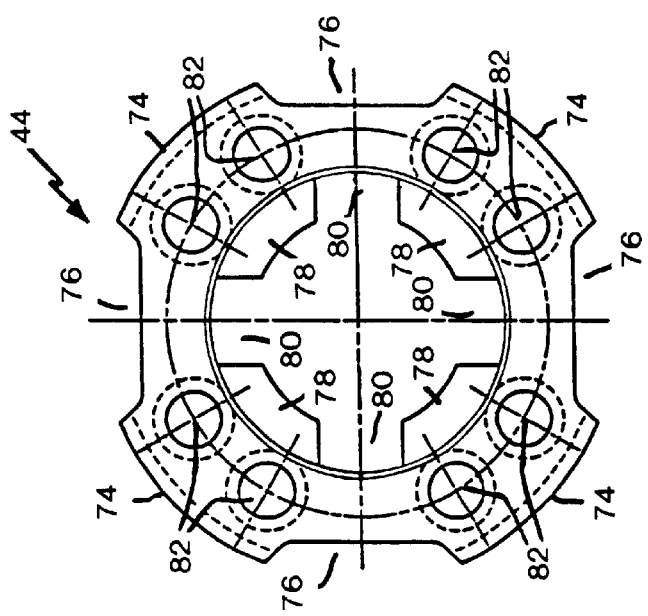
FIG. 6 is an inboard end view of the adaptor element.

As can best be seen in FIGS. 4–6, the adaptor 44 is a generally ring-shaped element having radially outwardly protruding lugs 74 spaced by flutes 76, and optionally radially inwardly protruding lugs 78 also spaced by flutes 80. Holes 82 accommodate the screws 45 used to secure the adaptor to the roll end.

The external flutes 76 allow the internal lugs 56 of the threaded ring 34 to pass during initial mounting of the bearing assembly on the roll neck, as well as during removal of the bearing assembly from the roll neck. Once the bearing assembly is mounted, the threaded ring 34 is rotated to align its internal lugs 56 with the external lugs 74 of the adaptor, thereby establishing an interlocked relationship therebetween. The coupling element 36 is then installed to prevent further relative rotation between these two components.

The inwardly protruding lugs 78 and intervening flutes 80 may be employed to mechanically couple the removable hydraulically actuated tool of the type described in copending U.S. application Ser. No. 09/605,601, now U.S. Pat. No. 6,415,489, to the roll end.

When detachably secured in place as shown in FIG. 1, the adaptor 44 is constructed and arranged to project axially from the distal end of the roll neck. Preferably, the outer and inner lugs 74, 78 are in radial alignment, with the holes 82 and the screws 45 extending therethrough located between the radially aligned lugs.

Use of the adaptor 44 obviates any need for machining grooves or bayonet lugs into the end of the roll neck. This in turn accommodates a beneficial shortening of the roll neck. The adaptor is a robust component better suited to absorbing axial loading of the bearing during a rolling operation.

We claim:

1. An apparatus for retaining a bearing assembly on the neck of a roll in a rolling mill, said apparatus comprising:

an adaptor element having outwardly projecting first lugs circumferentially separated by first flutes, said adaptor element being constructed and arranged to project axially from a distal end of the roll neck;

fastening means for detachably securing said adaptor element to the distal end of the roll neck; and a locking element comprising an integral component of said bearing assembly, said locking element having inwardly projecting second lugs circumferentially separated by second flutes, said locking element being rotatable between an unlocked position at which said second lugs are aligned with said first flutes to accommodate axial shifting of said bearing assembly onto and off of the roll neck, and a locked position at which said second lugs are aligned with said first lugs to axially retain the bearing assembly on the roll neck.

2. An apparatus for retaining a bearing assembly on the neck of a roll in a rolling mill, said apparatus comprising:

a ring-shaped adaptor element having outwardly projecting first lugs circumferentially separated by first flutes;

fastening means for detachably securing said adaptor element to a distal end of the roll neck, said adaptor element, when thus secured, being constructed and arranged to project axially from the distal end of the roll neck, said fastening means being aligned radially with said first lugs and being threaded into the distal end of the roll neck; and a locking element comprising an integral component of the bearing assembly, said locking element having inwardly projecting second lugs circumferentially separated by second flutes, said locking element being rotatable between an unlocked position at which said second lugs are aligned with said first flutes to accommodate axial shifting of said bearing assembly onto and off of said roll neck, and a locked position at which said second lugs are aligned with said first lugs to axially retain the bearing assembly on the roll neck.

3. An apparatus for retaining a bearing assembly on the neck of a roll in a rolling mill, said apparatus comprising:

an adaptor element having a cylindrical configuration with outwardly projecting first lugs circumferentially separated by first flutes, and with circumferentially spaced inwardly projecting third lugs;

fastening means for detachably securing said adaptor element to a distal end of the roll neck; and a locking element comprising an integral component of said bearing assembly, said locking element having inwardly projecting second lugs circumferentially separated by second flutes, said locking element being rotatable between an unlocked position at which said second lugs are aligned with said first flutes to accommodate axial shifting of said bearing assembly onto and off of the roll neck, and a locked position at which said second lugs are aligned with said first lugs to axially retain the bearing assembly on the roll neck.

4. The apparatus of claim 3 wherein said adaptor element is constructed and arranged to project axially from the distal end of the roll neck.

5. The apparatus of claim 3 wherein said third lugs are aligned radially with said first lugs.

6. The apparatus of claim 5 wherein said fastening means are arranged between said first and third lugs.

7. An apparatus for retaining a bearing assembly on the neck of a roll in a rolling mill, said apparatus comprising:

an adaptor element having outwardly projecting adaptor lugs circumferentially separated by first flutes;

fastening means for detachably securing said adaptor element to a distal end of the roll neck, said fastening means comprising fasteners threaded into the said distal end; and a locking element comprising an integral component of said bearing assembly, said locking element having inwardly projecting second lugs circumferentially separated by second flutes, said locking element being rotatable between an unlocked position at which said second lugs are aligned with said first flutes to accommodate axial shifting of said bearing assembly onto and off of the roll neck, and a locked position at which said second lugs are aligned with said first lugs to axially retain the bearing assembly on the roll neck.

8. The apparatus of claim 7 wherein said fasteners are aligned radially with said first lugs.

* * * * *